United States Patent
Dellock et al.

(10) Patent No.: US 11,254,291 B2
(45) Date of Patent: Feb. 22, 2022

(54) HEATED WIPERS FOR MOTOR VEHICLES

(71) Applicant: FORD GLOBAL TECHNOLOGIES, LLC, Dearborn, MI (US)

(72) Inventors: Paul Kenneth Dellock, Northville, MI (US); Richard Gall, Ann Arbor, MI (US); Stuart C. Salter, White Lake, MI (US); David Brian Glickman, Southfield, MI (US); Jose Garcia Crespo, Blooomfield Township, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 108 days.

(21) Appl. No.: 16/713,629

(22) Filed: Dec. 13, 2019

(65) Prior Publication Data
US 2021/0179027 A1    Jun. 17, 2021

(51) Int. Cl.
*B60S 1/38* (2006.01)
(52) U.S. Cl.
CPC ................... *B60S 1/3805* (2013.01)
(58) Field of Classification Search
CPC ............... B60S 1/3803; B60S 1/3805; B60S 2001/3827; B60S 2001/3829
See application file for complete search history.

(56) References Cited

U.S. PATENT DOCUMENTS

| | | | | |
|---|---|---|---|---|
| 3,116,509 A * | 1/1964 | Contant | ............... | B60S 1/3801 15/250.48 |
| 4,928,344 A * | 5/1990 | Bliss | ............... | B60S 1/3805 15/250.06 |
| 5,478,605 A * | 12/1995 | Ichise | ............... | B26D 3/08 15/250.48 |
| 7,568,256 B1 * | 8/2009 | Addison | ............... | B60S 1/3805 15/250.06 |
| 10,081,336 B2 | 9/2018 | Jones | | |
| 2013/0193129 A1 * | 8/2013 | Jones | ............... | B60S 1/381 219/202 |
| 2016/0135253 A1 * | 5/2016 | Tomovic | ............... | B60S 1/3805 252/511 |
| 2017/0129460 A1 * | 5/2017 | Friesen | ............... | B60S 1/3805 |
| 2018/0093643 A1 | 4/2018 | Coleman | | |

FOREIGN PATENT DOCUMENTS

| | | |
|---|---|---|
| DE | 19636796 A1 | 3/1998 |
| WO | 98/25780 | 6/1998 |

\* cited by examiner

*Primary Examiner* — Andrew A Horton
(74) *Attorney, Agent, or Firm* — David Coppiellie; Carlson, Gaskey & Olds, P.C.

(57) ABSTRACT

This disclosure details motor vehicle wiper systems and associated methods for heating wiper blades of the wiper systems. In exemplary embodiments, a wiper blade of a wiper may include a beam blade portion, a tip portion, and a heater element. Each of the beam blade portion, the tip portion, and the heater element may include a different material composition. The material composition of the heater element, for example, may include a thermally conductive polymer. The temperature of the blade may be regulated by adjusting a current flow through the thermally conductive polymer heater element.

18 Claims, 4 Drawing Sheets

HEATED WIPERS FOR MOTOR VEHICLES

TECHNICAL FIELD

This disclosure relates to wiper systems for motor vehicles, and more particularly to wiper systems that include heated wiper blades.

BACKGROUND

Motor vehicles include wipers configured to remove rain, snow, ice, and other debris from the windshield and other glass surfaces of the vehicle. In addition to wipers, some vehicles include features configured to reduce the buildup of ice and snow on the windshield. For example, most vehicles include windshield defrosters and windshield washer nozzles, which are configured to spray windshield washer fluid on the windshield. Heated windshield wipers are also known, although they are typically not standard vehicle features. Rather, they are more commonly sold as aftermarket accessories.

SUMMARY

A wiper for a motor vehicle according to an exemplary aspect of the present disclosure includes, among other things, a blade including a beam blade portion, a tip portion, and a heater element. Each of the beam blade portion, the tip portion, and the heater element includes a different material composition.

In a further non-limiting embodiment of the foregoing wiper, the beam blade portion is connected to a beam.

In a further non-limiting embodiment of either of the foregoing wipers, a cover is connected to the beam, and a power wire is routed between the cover and the beam.

In a further non-limiting embodiment of any of the foregoing wipers, the heater element is an electrically conductive polymer heater element.

In a further non-limiting embodiment of any of the foregoing wipers, the electrically conductive polymer heater element includes an electrically conductive thermoplastic polyurethane (TPU).

In a further non-limiting embodiment of any of the foregoing wipers, a control module is configured to regulate a temperature of the blade by adjusting a current flow through the electrically conductive polymer heater element.

In a further non-limiting embodiment of any of the foregoing wipers, a first material composition of the beam blade portion includes ethylene propylene diene monomer (EPDM) rubber, and a second material composition of the tip portion includes EPDM rubber that is modified by a high aspect ratio expanded graphite.

In a further non-limiting embodiment of any of the foregoing wipers, a third material composition of the heater element includes an electrically conductive thermoplastic polyurethane (TPU).

In a further non-limiting embodiment of any of the foregoing wipers, a first portion of the heater element is connected to the beam blade portion and a second portion of the heater element extends inside the tip portion.

In a further non-limiting embodiment of any of the foregoing wipers, a sensor system is configured to monitor a temperature associated with the blade, and a control module is configured to adjust a current flow through the heater element based on the temperature.

In a further non-limiting embodiment of any of the foregoing wipers, the wiper is a windshield wiper.

In a further non-limiting embodiment of any of the foregoing wipers, the blade is devoid of metallic based materials.

A method according to another exemplary aspect of the present disclosure includes, among other things, heating a blade of a wiper of a vehicle wiper system with an electrically conductive polymer heater element.

In a further non-limiting embodiment of the foregoing method, the method includes adjusting a flow of a current through the electrically conductive heater element based on a temperature associated with the blade.

In a further non-limiting embodiment of either of the foregoing methods, the flow of the current is correlated to an ambient temperature within a first look-up table that is stored in a memory of a control module of the vehicle wiper system.

In a further non-limiting embodiment of any of the foregoing methods, the method includes reducing the flow of the current through the electrically conductive heater element based on an amount of time that has passed since beginning to heat the blade.

In a further non-limiting embodiment of any of the foregoing methods, the flow of the current is correlated to the amount of time that has passed since beginning to heat the blade within a second look-up table stored in the memory.

In a further non-limiting embodiment of any of the foregoing methods, heating the blade includes providing a first amount of power to the electrically conductive polymer heater element when a temperature of the blade is outside a target temperature range.

In a further non-limiting embodiment of any of the foregoing methods, heating the blade includes providing a second amount of power to the electrically conductive polymer heater element when the temperature of the blade reaches an upper threshold of the target temperature range.

In a further non-limiting embodiment of any of the foregoing methods, heating the blade includes providing a third amount of power to the electrically conductive polymer heater element when the temperature of the blade reaches a lower threshold of the target temperature range.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure details motor vehicle wiper systems and associated methods for heating wiper blades of the wiper systems. In exemplary embodiments, a wiper blade of a wiper may include a beam blade portion, a tip portion, and a heater element. Each of the beam blade portion, the tip portion, and the heater element may include a different material composition. The material composition of the heater element, for example, may include a thermally conductive polymer. The temperature of the blade may be regulated by adjusting a current flow through the thermally conductive polymer heater element. These and other features of this disclosure are described in greater detail below.

Figure 1:
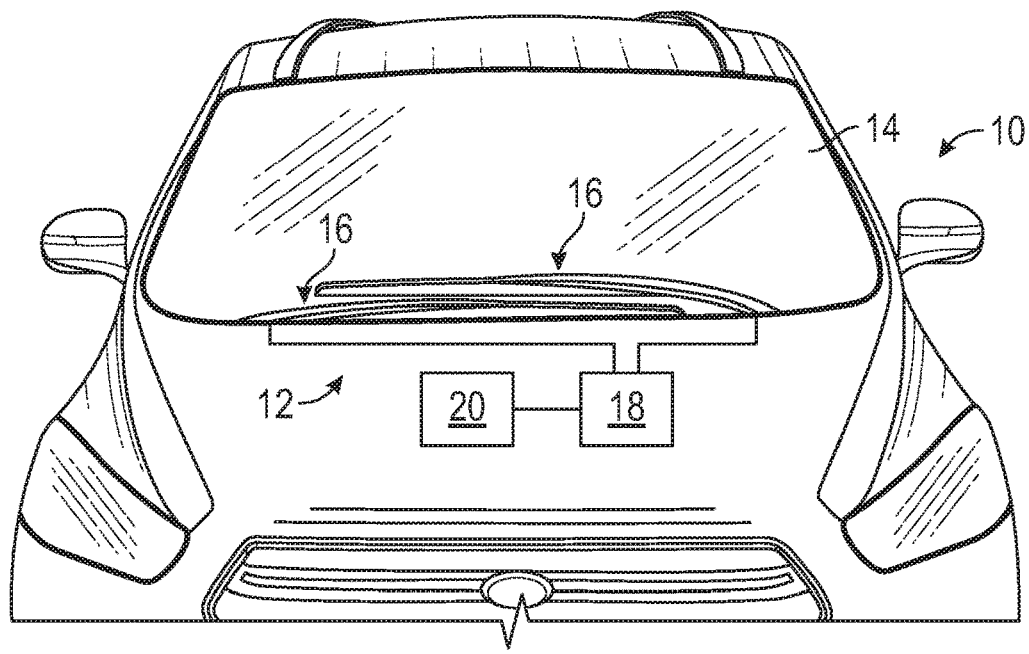
FIG. 1 is a partial front view of a motor vehicle equipped with a wiper system.

FIG. 1 schematically illustrates a vehicle 10. The vehicle 10 could be a car, a truck, a van, a sport utility vehicle, or any other type of vehicle. The vehicle 10 could also be a conventional, internal combustion engine powered vehicle, a traction battery powered hybrid electric vehicle (HEV), a plug-in hybrid electric vehicle (PHEV), etc.

Although a specific component relationship is illustrated in the figures of this disclosure, the illustrations are not intended to limit this disclosure. The placement and orientation of the various components of the vehicle 10 are shown schematically and could vary within the scope of this disclosure. In addition, the various figures accompanying this disclosure are not necessarily drawn to scale, and some features may be exaggerated or minimized to emphasize certain details of a particular component.

The vehicle 10 includes a wiper system 12. The wiper system 12 is capable of wiping away precipitation (e.g., rain, snow, ice, and/or other debris) that may accumulate on a windshield 14 or any other exterior glass surface/window of the vehicle 10. The windshield 14 could be either a front or rear windshield of the vehicle 10. The wiper system 12 may be a single arm, tandem, opposed dual, or any other type of wiper system. Therefore, the wiper system 12 could include one or more wipers 16 that are configured to move relative to the windshield 14.

In this disclosure, the wipers 16 are heated wipers, meaning they are configured to be heated to remove snow and ice adjacent to the wipers 16, which helps clear the windshield 14 during inclement weather conditions. The wipers 16 may be electrically coupled to a control module 18, which in turn may be electrically coupled to a power supply 20. Although schematically illustrated as a single controller, the control module 18 may be part of a vehicle control system that includes a plurality of additional control modules for interfacing with and commanding operation of the various components of the vehicle 10. In an embodiment, the control module 18 is part of a body control module (BCM) of the vehicle 10.

The power supply 20 may be a dedicated battery of the wiper system 12, a low voltage battery (e.g., a 12V battery) of the vehicle 10, a high voltage traction battery of the vehicle 10, etc. While the control module 18 and the power supply 20 are shown separately, these components could be integrated into a combined unit in some embodiments.

The wiper system 12 shown in FIG. 1 and described in the preceding paragraphs is but one example of how windshield wipers could be configured and arranged for wiping precipitation from the windshield 14. A person of ordinary skill in the art would understand that other wiper configurations and arrangements are possible. Accordingly, it should be appreciated that the specific wiper arrangement of FIG. 1 is not intended to limit this disclosure.

Figure 2:
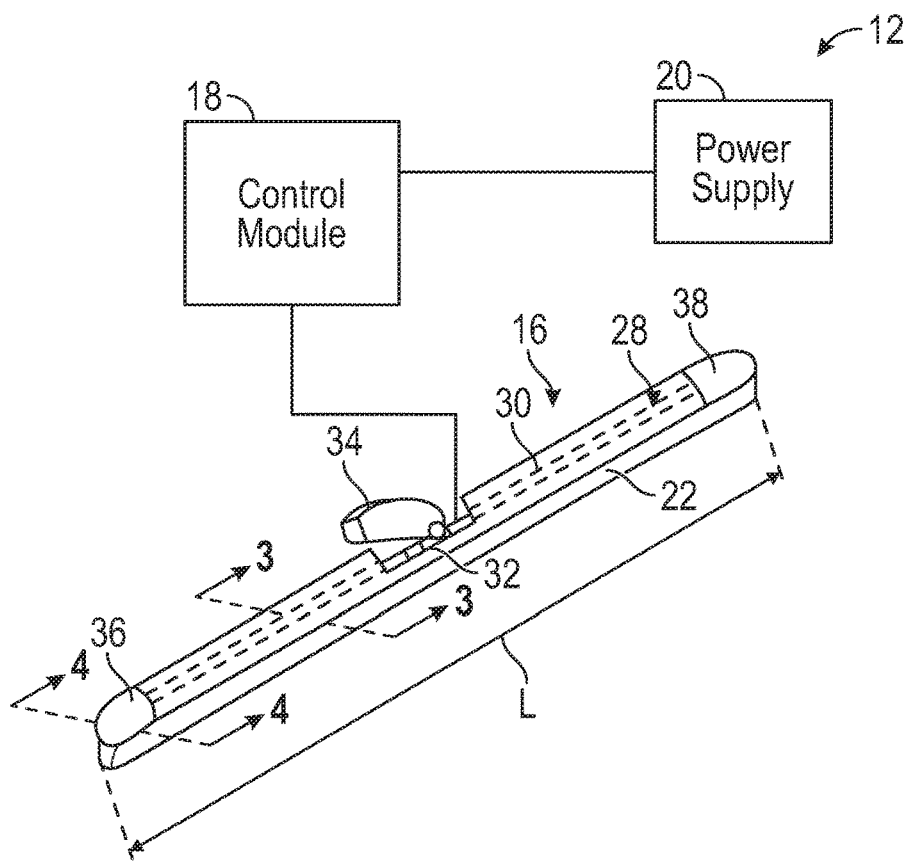
FIG. 2 illustrates an exemplary wiper system for a motor vehicle.

FIG. 2 schematically illustrates select portions of the wiper system 12 of FIG. 1. In particular, FIG. 2 illustrates one of the wipers 16, the control module 18, and the power supply 20 without the remainder of the vehicle 10 for simplicity and ease of reference. To the extent the wiper system 12 includes more than one wiper, the additional wipers may be arranged in substantially the same way as the wiper 16 of FIG. 2.

The wiper 16 spans a length L and has a blade 22 spanning substantially the entire length L. The blade 22 may include a beam blade portion 24 that is supported by a beam 26 (see FIG. 3). The beam blade portion 24 and the beam 26 may also span substantially the entire length L.

The beam blade portion 24 acts as a foundation of the blade 22 and may be made of a variety of materials. In an embodiment, the beam blade portion 24 is made of a relatively stiff silicone rubber, such as ethylene propylene diene monomer (EPDM) rubber, natural rubber, or synthetic rubber. The material of the beam blade portion 24 may have a Shore A hardness above about 60, in one embodiment, or within a range of about 80 to about 90, in other embodiments. In this disclosure, the term "about" means that the expressed quantities or ranges need not be exact but may be approximated and/or larger or smaller, reflecting acceptable tolerances, conversion factors, measurement error, etc.

The beam 26 may be a curved beam made of a variety of materials. In an embodiment, the beam 26 is made of steel. In another embodiment, the beam 26 is made of stainless steel.

The beam 26 may be covered by a cover 28. The cover 28, which may be made up of one or more pieces, may be snapped onto the beam 26 and may provide an attractive appearance to the wiper 16. The cover 28 may be shaped to reduce aerodynamic wind lift when the vehicle 10 is operating at relatively high speeds. A cutout 32 may be provided near a midpoint of the cover 28 for accommodating an attachment 34, such as a pivot arm configured to attach the wiper 16 to a wiper arm (not shown).

A power wire 30 (shown partially in phantom in FIG. 2) may be routed within the space between the beam 26 and the cover 28. The power wire 30 may extend along the length L of the wiper 16 and is configured to supply power from the power supply 20 to the blade 22 when activated by the control module 18, thereby heating the blade 22. End caps 36, 38 may be attached at opposite ends of the cover 28 for concealing the power wire 30 within the wiper 16.

Figure 3:
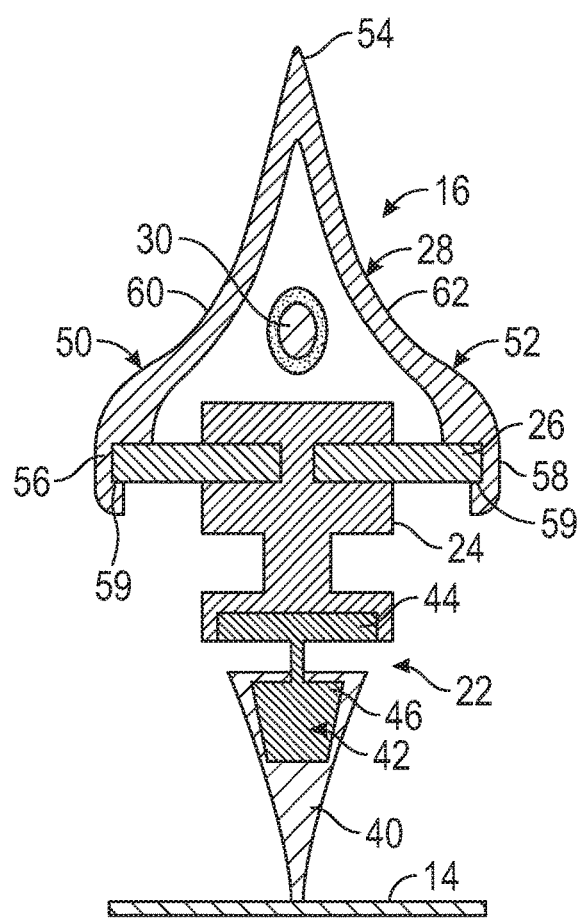
FIG. 3 is a cross-sectional view through section 3-3 of FIG. 2.

FIG. 3 illustrates an exemplary arrangement of the wiper 16 and further details the blade 22 of the wiper 16. In addition to the beam blade portion 24, the blade 22 may include a tip portion 40 and an electrically conductive polymer heater element 42. Each of the beam blade portion 24, the tip portion 40, and the electrically conductive polymer heater element 42 may have a different material composition. Providing the blade 22 with at least three different material compositions allows the blade 22 to effectively conduct heat, even to the tip portion 40 of the blade 22, while also maintaining sufficient contact with the windshield 14. The disclosed arrangement allows the blade 22 to reach a relatively high temperature relatively quickly, while remaining hotter during operation, compared to known heated windshield wipers.

In an embodiment, the tip portion 40 of the blade 22 is generally triangular-shaped in cross-section and tapers in width toward the windshield 14. As the electrically conductive polymer heater element 42 heats up in response to electricity being applied across its length, it is desirable to transfer a majority of the heat that is generated to the tip portion 40, which is the portion of the blade 22 that contacts the windshield 14. However, silicone based structures such as those made from EPDM rubber are relatively poor heat conductors (thermal conductivity of about 0.5 W/m·K) and therefore may not sufficiently transfer or conduct heat to the windshield 14 from the electrically conductive polymer heater element 42. The tip portion 40 may therefore be made from EPDM rubber that is modified by the addition of multiple grades of graphite that improve thermal conductivity (to about 1.2 W/m·K, for example) of the tip portion 40 of the blade 22. The modified EPDM rubber may also mitigate a phenomenon known as blade chatter, which is the rapid, undesirable movement of a wiper blade relative to the windshield 14.

In a particular embodiment, the tip portion 40 of the blade 22 may be made of EPDM rubber that is modified by the additions of both a traditional graphite and a high aspect ratio expanded graphite, such as TIMREX® 001 OR TIMREX® 011, manufactured by Imerys Graphite and Carbon, that has a greater thermal conductivity compared to the conventional graphite. In an embodiment, about 20% graphite is added to the EPDM rubber, with about 20% of the added graphite being the high aspect ratio expanded graphite and about 80% being the more traditional graphite. The increased thermal conductivity of the tip portion 40 better disperses heat throughout the blade 22, thereby increasing the ease of snow and ice removal from the windshield 14.

The electrically conductive polymer heater element 42 may be made of an electrically conductive polymer, such as an electrically conductive thermoplastic polyurethane (TPU), that is configured to heat up when electricity is applied across its length. An exemplary electrically conductive TPU may include fillers such as a multi-layer graphene combined with a conductive filler. In an embodiment, the electrically conductive TPU is made by growing single wall carbon nanotubes on a substrate such as glass fibers or spheres. A particular example of the electrically conductive TPU includes 2% single wall carbon nanotubes by weight and 8% graphene platelets by weight. The conductive filler has intertwined carbon nanotubes grown on the surface that are highly conductive, and when combined with the graphene, the carbon nanotubes interconnect with and jet out from the surface of the substrate connected to the graphene, thereby forming the electrically conductive TPU.

The electrically conductive polymer heater element 42 may include a first portion 44 that is connected to the beam blade portion 24 and a second portion 46 that is received within the tip portion 40 of the blade 22. In an embodiment, the beam blade portion 24, the electrically conductive polymer heater element 42, and the tip portion 40 are co-extruded out of three different material compositions (discussed above) to form the single-piece, monolithic body of the blade 22. The blades 22 of this disclosure therefore are completely devoid of metallic based components.

Figure 4:
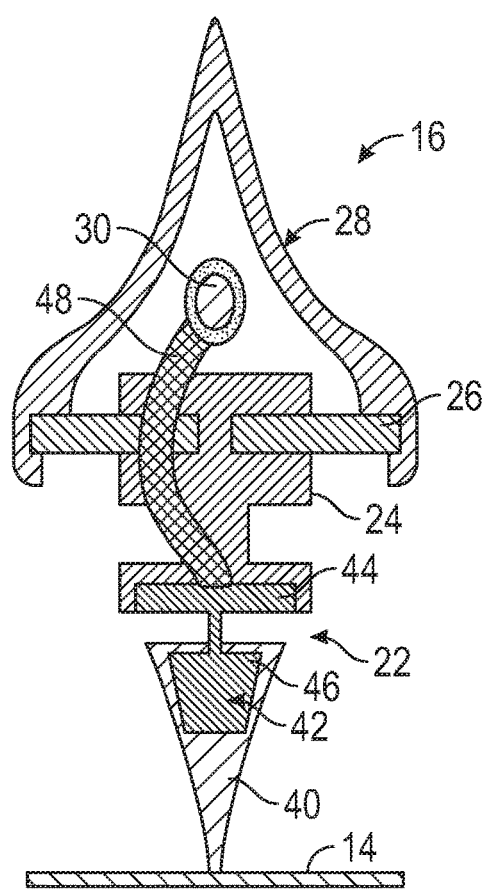
FIG. 4 is a cross-sectional view through section 4-4 of FIG. 2.

The electrically conductive polymer heater element 42 is electrically coupled to the power wire 30 by way of a lead 48 (see FIG. 4). In an embodiment, the lead 48 extends between the power wire 30 and the electrically conductive polymer heater element 42 beneath the first end cap 36, as shown in FIGS. 2 and 4, for example. While not illustrated, it should be understood that there is a similar lead beneath the second end cap 38 between the power wire 30 and an opposite end of the electrically conductive polymer heater element 42. One of the leads provides a positive terminal, and another of the leads provides a negative terminal. In this way, current may flow through the electrically conductive polymer heater element 42, which generates heat that can then be conducted within the blade 22 for more easily removing ice and snow accumulation on the windshield 14.

As alluded to above, the cover 28 may be aerodynamically shaped. Such a shape reduces the effect of wind drag brought about by the increased size of the wiper 16 needed to accommodate the power wire 30, for example. In an embodiment, the cover 28 includes first and second walls 50, 52 that extend from the beam 26 to a nose 54. Adjacent the beam 26, the walls 50, 52 include convex portions 56, 58, which are convex when viewed from an exterior of the wiper 16. The convex portions 56, 58 include recesses 59 on an interior surface thereof to provide a connection with the beam 26. In an embodiment, the connection is a snap-fit connection, although other types of connections come within the scope of this disclosure.

Between the convex portions 56, 58 and the nose 54, each wall 50, 52 may include a concave portion 60, 62, which are concave when viewed from an exterior of the wiper 16. The concave portions 60, 62 span a majority of the height (e.g., the up-and-down direction, relative to FIG. 3) of the cover 28. The concave portions 60, 62 converge at the nose 54, which may be either pointed or rounded. While the above discussion is relative to the cover 28, it should be understood that the end caps 36, 38 may be shaped similarly to the cover 28.

Figure 5:
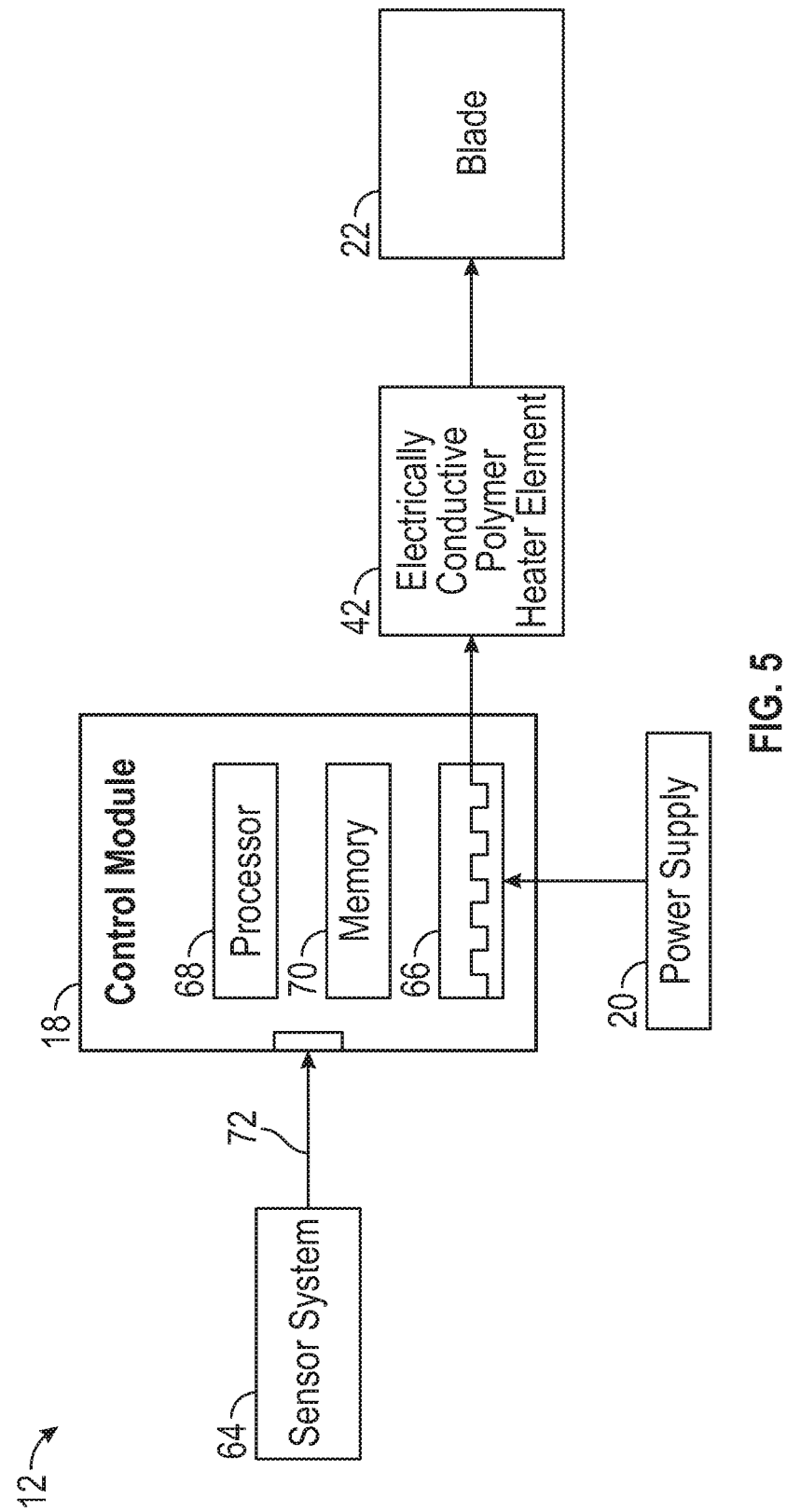
FIG. 5 is a block diagram of an exemplary wiper system.

A schematic block diagram of the wiper system 12 is illustrated in FIG. 5 (with continued reference to FIGS. 1-4). The wiper system 12 may include a sensor system 64 that is electrically coupled to the control module 18. The sensor system 64 may include one or more sensors that provide input signals to the control module 18. In an embodiment, the sensor system 64 includes a precipitation sensor configured to detect the presence of moisture (e.g., rain, snow, ice, etc.) on a surface (e.g., the windshield 14) of the vehicle 10. In another embodiment, the sensor system 64 includes a thermistor embedded within the blade 22 of the wiper 16. In another embodiment, the sensor system 64 includes an external temperature sensor configured to sense the ambient temperature of the environment surrounding the vehicle 10. In yet another embodiment, the sensor system 64 includes both a thermistor within the blade 22 and an exterior temperature sensor.

The control module 18 may regulate the temperature of the blade 22 of the wiper 16 by adjusting the current flowing through the electrically conductive polymer heater element 42 in order to achieve a target temperature of the blade 22. In an embodiment, the target temperature is about 90° C. (about 194° F.) to about 110° C. (about 230° F.). However, the actual target temperature of the blade 22 may vary and is design specific.

The control module 18 may include a pulse width modulation (PWM) circuit 66 for controlling the flow of power from the power supply 20 to the blade 22 of the wiper 16. The control module 18 may additionally include a processing unit 68 and non-transitory memory 70 for executing the various control strategies of the wiper system 12. As discussed below, the control module 18 may receive and process various inputs to control the wiper 16 in a desired manner for heating the blade 22 and thus reducing the accumulation of frozen precipitation on the windshield 14.

A first input 72 to the control module 18 may include temperature signals from the sensor system 64. The temperature signals may indicate the current temperature of the blade 22 and/or the ambient temperature of the environment surrounding the vehicle 10. The control module 18 may utilize the temperature signals to infer how much power should be provided from the power supply 20 to the electrically conductive polymer heater element 42 for heating the blade 22.

The processing unit 68 of the control module 18, in an embodiment, is configured to execute one or more programs stored in the memory 70 of the control module 18. For example, a first exemplary program, when executed, may control the PWM circuit 66 to vary the amount of power provided to the electrically conductive polymer heater element 42 from the power supply 20 based on the temperature signals sensed by the sensor system 64. For example, as the ambient temperature decreases, the amount of power provided to the electrically conductive polymer heater element 42 may be automatically increased in order to maintain the blade 22 within the target temperature range. A pre-calculated blade current that corresponds to each possible detected temperature value may be stored in the memory 70 of the control module 18, such as in one or more look-up tables. The control module 18 can accurately estimate the correct blade current to be applied to the electrically conductive polymer heater element 42 for any given temperature by referencing the look-up table.

A second exemplary program, when executed, may control the PWM circuit 66 to vary the amount of power provided to the electrically conductive polymer heater element 42 from the power supply 20 based on an amount of time that has passed since heating of the wiper 16 began. For example, the longer the wiper 16 has been heated, the less power is generally required to maintain the blade 22 within the target temperature range. A pre-calculated blade current offset that corresponds to varying amounts of time that the wiper 16 has been heated may be stored in the memory 70 of the control module 18, such as in one or more additional look-up tables. The control module 18 can accurately vary the amount of current to be applied to the electrically conductive polymer heater element 42, via the PWM circuit 66, based on the amount of time that has passed since the blade 22 began to be heated by referencing such a look-up table.

Figure 6:
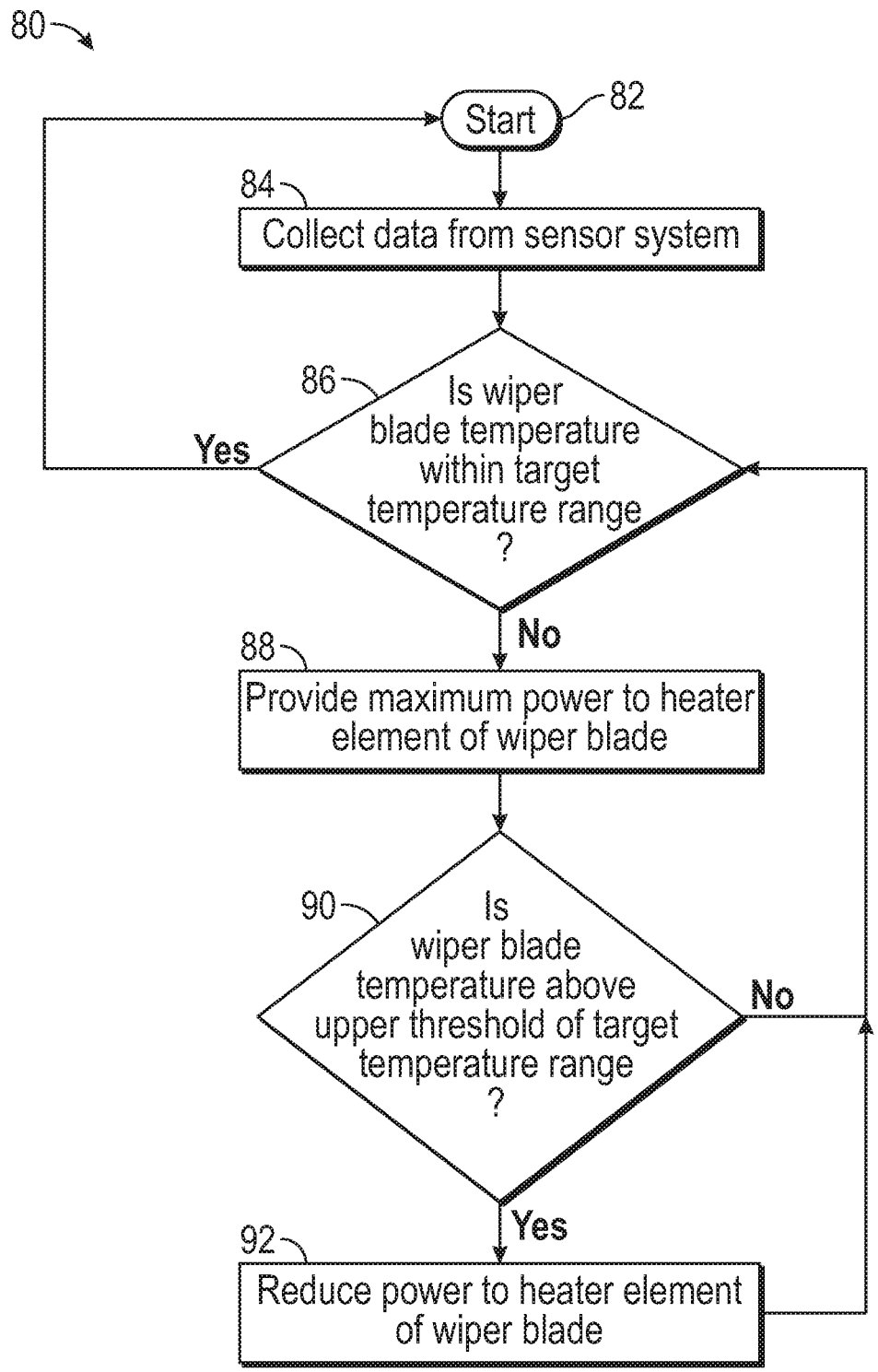
FIG. 6 schematically illustrates an exemplary method for heating a wiper blade of a wiper system.

FIG. 6, with continued reference to FIGS. 1-5, schematically illustrates a method 80 for heating a wiper 16 of the wiper system 12 in a manner that reduces the accumulation of frozen precipitation on the windshield 14 during inclement weather conditions. In an embodiment, the control module 18 of the wiper system 12 is programmed with one or more algorithms adapted to execute the exemplary method 80.

The exemplary method 80 begins at block 82. At block 84, the control module 18 may collect data from the sensor system 64. The data collected by the control module 18 may include precipitation signals, ambient temperature signals, and/or wiper temperature signals. This data may be used to determine whether the wiper 16 should be controlled in a certain manner to prevent the buildup of frozen precipitation on the windshield 14.

Next, a block 86, the control module 18 may determine whether the blade 22 of the wiper 16 is within a target temperature range (e.g., between about 90° C. (about 194° F.) to about 110° C. (about 230° F.)). If NO, the method 80 may proceed to block 88 by controlling the PWM circuit 66 to provide maximum power to the electrically conductive polymer heater element 42 of the blade 22.

Subsequently, at block 90, the control module 80 may determine, via additional feedback from the sensor system 64, whether the temperature of the blade 22 exceeds an upper threshold of the target temperature range. If YES, the method 80 may proceed to block 92 at which time the control module 18 may control the PWM circuit 66 to provide a reduced amount of power to the electrically conductive polymer heater element 42 of the blade 22 until reaching a lower threshold of the target temperature range. The method 80 may then repeat in looped fashion in order to constantly vary the current provided to the electrically conductive polymer heater element 42 in order to maintain the temperature of the blade 22 within the target temperature range.

The vehicle wiper systems described herein leverage material advancements in order to heat wiper blades more quickly, efficiently, and economically as compared to known heated wipers. The wiper blades of this disclosure utilize a unique polymeric core material that heats up when electricity is applied across a length of the blade. Metallic heater element structures may therefore be eliminated from the blade of the wiper.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A wiper for a motor vehicle, comprising:
a blade including a beam blade portion, a tip portion, and a heater element,
wherein each of the beam blade portion, the tip portion, and the heater element includes a different material composition,
wherein at least one of the beam blade portion, the tip portion, or the heater element comprises a material composition that is modified by a graphite material,
wherein the material composition includes a rubber that is modified by the graphite material,
wherein the graphite material includes a traditional graphite and an expanded graphite.

2. The wiper as recited in claim 1, wherein the beam blade portion is connected to a beam.

3. The wiper as recited in claim 2, comprising a cover connected to the beam, and a power wire routed between the cover and the beam.

4. The wiper as recited in claim 3, wherein the heater element is electrically coupled to the power wire by a lead.

5. The wiper as recited in claim 1, wherein the heater element is an electrically conductive polymer heater element.

6. The wiper as recited in claim 5, comprising a control module configured to regulate a temperature of the blade by adjusting a current flow through the electrically conductive polymer heater element.

7. The wiper as recited in claim 1, wherein a first portion of the heater element is connected to the beam blade portion and a second portion of the heater element extends inside the tip portion.

8. The wiper as recited in claim 1, comprising:
a sensor system configured to monitor a temperature associated with the blade; and
a control module configured to adjust a current flow through the heater element based on the temperature.

9. The wiper as recited in claim 8, wherein the control module is configured to correlate the current flow to an ambient temperature within a first look-up table that is stored in a memory of the control module.

10. The wiper as recited in claim 8, wherein the control module is configured to command a first amount of power to the heater element when the temperature of the blade is outside a target temperature range and is further configured to command a second amount of power to the heater element when the temperature of the blade reaches an upper threshold of the target temperature range.

11. The wiper as recited in claim 10, wherein the control module is configured to command a third amount of power to the heater element when the temperature of the blade reaches a lower threshold of the target temperature range.

12. The wiper as recited in claim 1, wherein the wiper is a windshield wiper.

13. The wiper as recited in claim 1, wherein the blade is devoid of metallic based materials.

14. The wiper as recited in claim 1, wherein the material composition includes about 20% of the graphite material.

15. The wiper as recited in claim 1, wherein the heater element includes a second material composition that includes an electrically conductive thermoplastic polyurethane (TPU).

16. A wiper for a motor vehicle, comprising:
a blade including a beam blade portion, a tip portion, and a heater element,
wherein each of the beam blade portion, the tip portion, and the heater element includes a different material composition,
wherein the heater element is an electrically conductive polymer heater element,
wherein the electrically conductive polymer heater element includes an electrically conductive thermoplastic polyurethane (TPU).

17. A wiper for a motor vehicle, comprising:
a blade including a beam blade portion, a tip portion, and a heater element,
wherein each of the beam blade portion, the tip portion, and the heater element includes a different material composition,
wherein a first material composition of the beam blade portion includes ethylene propylene diene monomer (EPDM) rubber and a second material composition of the tip portion includes EPDM rubber that is modified by a high aspect ratio expanded graphite.

18. The wiper as recited in claim 17, wherein a third material composition of the heater element includes an electrically conductive thermoplastic polyurethane (TPU).

* * * * *